(12) United States Patent
Kojovic

(10) Patent No.: US 8,830,645 B2
(45) Date of Patent: Sep. 9, 2014

(54) POWER SPIKE MITIGATION

(71) Applicant: Ljubomir A. Kojovic, Racine, WI (US)

(72) Inventor: Ljubomir A. Kojovic, Racine, WI (US)

(73) Assignee: Cooper Technologies Company, Houston, TX (US)

( * ) Notice: Subject to any disclaimer, the term of this patent is extended or adjusted under 35 U.S.C. 154(b) by 0 days.

(21) Appl. No.: 13/739,219

(22) Filed: Jan. 11, 2013

(65) Prior Publication Data

US 2014/0198419 A1    Jul. 17, 2014

(51) Int. Cl.
  *H02H 3/00*   (2006.01)
  *H02H 9/02*   (2006.01)
  *H02H 3/20*   (2006.01)
  *H02H 7/125*  (2006.01)
  *H02H 7/122*  (2006.01)

(52) U.S. Cl.
  CPC . *H02H 9/02* (2013.01); *H02H 3/20* (2013.01); *H02H 7/1222* (2013.01); *H02H 7/1252* (2013.01)
  USPC ............................................ 361/91.1; 361/72

(58) Field of Classification Search
  USPC .................... 361/18, 91.1, 72, 93.9
  See application file for complete search history.

(56) References Cited

U.S. PATENT DOCUMENTS

| 6,885,745 B1 * | 4/2005 | Handforth et al. ............. 379/412 |
| 2003/0020437 A1 * | 1/2003 | Kanamori .................... 323/222 |
| 2009/0230974 A1 | 9/2009 | Kojovic et al. |
| 2010/0020457 A1 | 1/2010 | Kojovic et al. |

FOREIGN PATENT DOCUMENTS

RU    2145760 C1    2/2000

OTHER PUBLICATIONS

International Search Report and Written Opinion for Corresponding PCT Application No. PCT/US2014/010956, mailed May 7, 2014 (6 pages).

* cited by examiner

*Primary Examiner* — Danny Nguyen
(74) *Attorney, Agent, or Firm* — King & Spalding LLP

(57) ABSTRACT

A method, device, and system for mitigating the effect of a power spike on a protective device. The device can receive an input signal and determine whether the input signal exceeds a threshold value. If so, the device simultaneously starts an initial time period and starts a latch time period, where the latch time period is greater than the initial time period. During the initial time period, the device replaces the input signal with a set value signal. After the initial time period ends and during the remainder of the latch time period, the device prevents the input signal from being replaced by the set value signal. If, during the remainder of the latch time period, the input signal exceeds the threshold value, a trip signal may be generated by a protective device.

20 Claims, 10 Drawing Sheets

POWER SPIKE MITIGATION

TECHNICAL FIELD

The present disclosure relates generally to relay protection and more particularly to systems, methods, and devices for mitigating erroneous relay operation caused by power spikes.

BACKGROUND

Switching of high-voltage electric apparatus (such as circuit breakers) can generate high-frequency voltage and/or current excursions, also called "spikes" or "bursts". These excursions can penetrate through instrument transformers and the corresponding secondary wiring to protective device inputs, distorting the relay input signals. While many protective devices filter higher frequencies, the distorted relay input signals caused by power excursions cannot be entirely eliminated. As such, the power excursions can penetrate through the relay filters as one or multiple power spikes superimposed on the measured signal. As a result, distorted relay input signals can cause erroneous operation of the protective device. This phenomenon can especially be a problem for fast-operating protective devices, such as differential relays.

SUMMARY

In general, in one aspect, the disclosure relates to a method for mitigating the effect of a power spike on a protective device. The method can include receiving an input signal, and determining that the input signal exceeds a threshold value. The method can also include, upon determining that the input signal exceeds the threshold value, starting an initial time period, and starting a latch time period, where the latch time period is greater than the initial time period. The method can further include replacing the input signal with a set value signal for the initial time period, where the set value signal has a value that is less than the threshold value. The method can also include, preventing, when the initial time period ends and during a remainder of the latch time period, further replacement of the input signal with the set value signal.

In another aspect, the disclosure can generally relate to a protective device. The protective device can include memory for storing instructions, and a hardware processor communicably coupled to the memory, where the hardware processor executes the instructions stored in the memory. The protective device can also include a timer that measures a latch time period and an initial time period, and a protection engine communicably coupled to the timer, a first sensing device, and the hardware processor. The protection engine can receive an input signal derived from a first signal generated by the first sensing device, and determine whether the input signal exceeds a threshold value. The protection engine can also initiate, when the input signal exceeds the threshold value, the timer to measure the initial time period and the latch time period. The protection engine can further replace the input signal with a set value signal during the initial time period. The protection engine can also, when the initial time period ends and during a remainder of the latch time period, further replacement of the input signal with the set value signal. The protective device can further include a trip mechanism operatively coupled to the protection engine, where the trip mechanism generates and sends a trip signal when the input signal, during the duration of the latch time period, exceeds the threshold value. Further, the latch time period can be greater than the initial time period.

In yet another aspect, the disclosure can generally relate to a protective device system. The protective device system can include a first sensing device coupled to a first conductor, where the first sensing device generates a signal based on power flowing through the first conductor. The protective device system can also include a protective device communicably coupled to the first sensing device. The protective device can include memory for storing instructions, and a hardware processor communicably coupled to the memory, where the hardware processor executes the instructions stored in the memory. The protective device can also include a timer that measures a latch time period and an initial time period, and a protection engine communicably coupled to the timer, the first sensing device, and the hardware processor. The protective engine can receive an input signal derived from the signal generated by the first sensing device, and determine whether the input signal exceeds a threshold value. The protective engine can further initiate, when the input signal exceeds the threshold value, the timer to measure the initial time period and the latch time period, and replace the input signal with a set value signal during the initial time period. The protective engine also can prevent, when the initial time period ends and during a remainder of the latch time period, further replacement of the input signal with the set value signal. The protective device can also include a trip mechanism operatively coupled to the protection engine, where the trip mechanism generates a trip signal when the input signal, during the remainder of the latch time period, exceeds the threshold value.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positionings may be exaggerated to help visually convey such principles. In the drawings, reference numerals designate like or corresponding, but not necessarily identical, elements.

DETAILED DESCRIPTION

Figure 1:
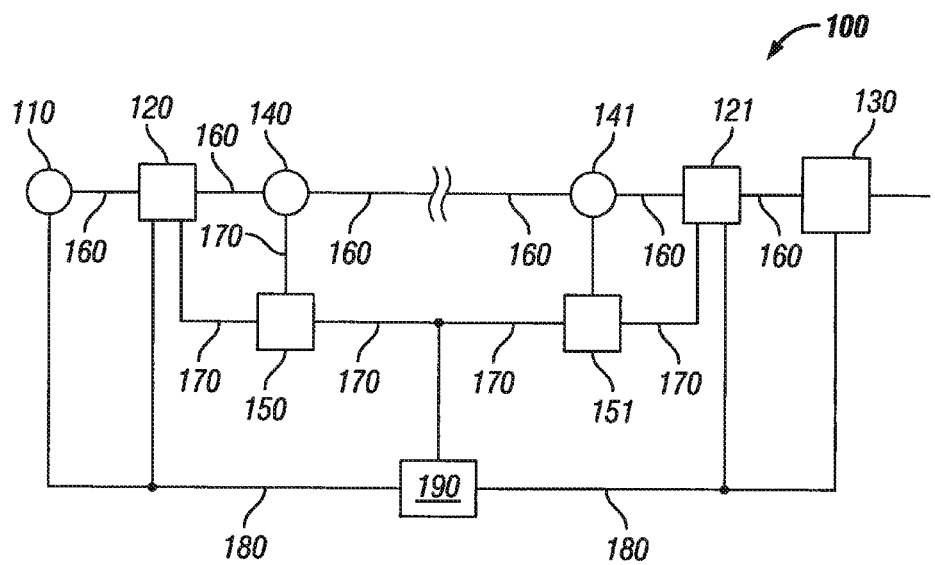
FIG. 1 shows a protective device system using an example protective device in accordance with certain example embodiments.

Example embodiments of power spike mitigation will now be described in detail with reference to the accompanying figures. Like, but not necessarily the same or identical, elements in the various figures are denoted by like reference numerals for consistency. In the following detailed description of the example embodiments, numerous specific details are set forth in order to provide a more thorough understanding of the disclosure herein. However, it will be apparent to one of ordinary skill in the art that the example embodiments herein may be practiced without these specific details. In other instances, well-known features have not been described in detail to avoid unnecessarily complicating the description. Further, certain descriptions (e.g., top, bottom, side, end, interior, inside, inner, outer) are merely intended to help clarify aspects of the invention and are not meant to limit embodiments described herein.

In general, example embodiments provide systems, methods, and devices for power spike mitigation. Specifically, example embodiments provide for protective devices that determine whether a power spike is a lone excursion or the start of a fault before actuating. In such a case, the protective device strikes a balance between not actuating (generating a trip signal) when the input signal includes a mere, isolated power spike and not delaying actuation overly long when a legitimate fault is present in the circuit. As used herein, a power spike can also be called a power excursion. A fault can include one or more power spikes, which would occur at the beginning of a fault.

Example protective devices discussed herein can be used with and/or monitor one or more of a number of voltages and/or currents, which can also be described as various levels of power. For example, a protective device can monitor power devices that are electrically coupled to 345 kV alternating current (AC), where such power is operating power. As another example, the protective device can operate on 24 V direct current (DC), where such power is control power.

As used herein, the term "high-power" is used to describe higher amounts of power. Higher amounts of power, in terms of current, can be any current at or above approximately 100 amperes (A), but can be less than 100 A in certain instances, as in a steady-state operating condition. High amounts of power can also be a voltage and/or current that is greater than a lower amount of power. In addition, the term "low-power" can be used to describe lower amounts of power. Low power can also be called control power and/or control current. Lower amounts of power, in terms of voltage, can be any voltage at or below 120 VAC.

In certain example embodiments, the protective device, the power device protected by the protective device, and/or a system that includes the example protective device is subject to meeting certain standards and/or requirements. For example, the Institute of Electrical and Electronics Engineers (IEEE) set standards as to wiring and protection of high power electrical systems. Use of example embodiments described herein meet (and/or allow a corresponding device to meet) such standards when required.

FIG. 1 shows an example protective device system 100 using an example protective device 150 in accordance with certain example embodiments. FIG. 1 includes a power source 110, a pair of breakers 120, 121, a passive load 130, a pair of sensing devices 140, 141, a pair of the example protective devices 150, 151, a number of high-power conductors 160, a number of low-power control conductors 170, a number of communication/control conductors 180, and a user 190. One or more components shown in FIG. 1 can be omitted, repeated, and/or substituted. Accordingly, embodiments of a protective device system should not be considered limited to the specific arrangements of components shown in FIG. 1. For example, one or both breakers 120 can be omitted. As another example, a motor or some other electrical device can be used in place of the power source 110.

The power source 110 is shown being electrically coupled to a breaker 120 using a high-power conductor 160. The power source 110 can provide electricity that is in AC format. The power source 110 can be physically separate from the other components of the system 100 and/or combined with another component of the system 100. The high-power conductor 160 can include one or more voltage conductors and a neutral conductor. In certain example embodiments, instead of generating power, the power source 110 can consume power, as a motor, capacitor, a transformer, or inductor. The passive load 130 can be any generating and/or consuming source of power.

In certain example embodiments, one or more conductors 160 is used to electrically couple the power source 110, the breakers 120, the passive load 130, the sensing devices 140, and/or any other components of the system 100. Each high-power conductor 160 described herein can carry voltage, current, or a combination thereof. In addition, each high-power conductor 160 described herein can be wire, cable, or other medium that can carry a voltage and/or current therethrough.

The high-power conductor 160 can be made of an electrically conductive material (e.g., copper, aluminum) and can have one or more electrically non-conductive materials (e.g., rubber, nylon, plastic) wrapped around the electrically conductive material. The electrically conductive material of the conductor can be one of a number of sizes that allow the high-power conductor 160 to carry the voltage and/or current required for the system 100. The amount of power (e.g., voltage, current) delivered, using the conductors 160, by the power source 110 to the breakers 120, the sensing devices 140, and the passive load 130 can be any amount suitable to operate the electrical devices electrically coupled to the other in the system 100.

The breakers 120, 121 are electrically coupled to the power source 110, the passive load 130, and each other using one or more high-power conductors 160. The breakers 120, 121 can be a manually and/or automatically operated electrical switch designed to protect an electrical circuit (e.g., the power source 110, the passive load 130) from damage caused by overload or short circuit. The breakers 120, 121 are also electrically coupled to one or more protective devices 150, 151 using conductor 170. A function of the breakers 120, 121 is to receive a trip signal from a protective device 150, 151 and, in response to the trip signal, operate (open) to interrupt continuity and immediately discontinue electrical flow. Each breaker 120, 121 can have an open position (used to discontinue electrical flow) and a closed position (used to allow electrical flow). The breaker 120, 121 can be any device that operates to change state during operations.

In certain example embodiments, when a breaker 120, 121 operates (changes state from open position to a closed position or changes state from a closed position to an open position), the switching operation of the breaker 120, 121 generates high-frequency voltage and/or current excursions, which can also be called bursts or spikes. As another example, a lighting strike can cause high-frequency voltage and/or current excursions. These spikes can penetrate through one or more sensing devices 140, 141 and carry on to the corresponding protective device 150, 151. In such a case, the spikes are superimposed with the input signal, distorting the input signal measured by the protective device 150, 151. The breakers 120, 121 shown can be the same (e.g., have the same size, voltage rating, current rating) or different from each other.

In certain example embodiments, the breakers 120, 121 are physically located in the proximity of one or more sensing devices 140. When a circuit breaker 120, 121 operates, the circuit breaker 120, 121 can generate one or more spikes, which can penetrate inside one or more protective devices 150, 151 through the corresponding sensing devices 140, 141. Operation of other nearby switching apparatus within the system 100 can also generate spike disturbances that are delivered to a protective device 150, 151 through the corresponding sensing device 140, 141.

In example embodiments, the sensing device 140, 141 is any device that generates (harvests) a representation of a current flowing through a conductor 160. When such a current flows through a conductor 160, the current can be called a line current. The example sensing device 140, 141 can be coupled (e.g., magnetically) to at least one conductor 160 and the corresponding protective device 150, 151. For example, the sensing device 140 can be electromagnetically coupled to a conductor 160, and electrically coupled to (capable of sending and receiving signals with respect to) the protective device 150 using conductor 170. In such a case, the sensing device 140 can clamp around and/or encircle the conductor 160.

The sensing device 140, 141 can have one or more leads 170 that carry the power harvested by the sensing device 140, 141 to the corresponding protective device 150, 151. The leads 170 (also called conductor 170) can be a form of conductor, as described above. For example, conductor 170 can be a fiber optic cable. The representation of the operating parameter (e.g., current) can be an electrical signal (e.g., analog signal, digital signal), an electro-mechanical signal, and/or any other suitable signal. The representation of the operating parameter can be a fractional amount of (proportionately smaller than) the operating parameter. The difference between the operating parameter and the representation of the operating parameter can be defined by a ratio. In one example embodiment, the representation of the operating parameter is sent by the sensing device 140, 141 to the corresponding protective device 150, 151. The representation of the operating parameter can be called an input signal. The input signal can be raw (unfiltered).

In certain example embodiments, the sensing device 140, 141 includes a primary winding and a secondary winding. The primary winding and the secondary winding typically have a known ratio (e.g., 10,000:1). As a result, in such a case, the secondary winding, to which the leads 170 are electrically coupled, generates a representation of the operating parameter that is 10,000 times less than the operating parameter. The sensing device 140, 141 can also be capable of harvesting power from one or more conductors 160 in the form of one or more voltage conductors, a neutral conductor, some other conductor, or any combination thereof. Alternatively, or in addition, a different sensing device 140, 141 can be used for each conductor (e.g., each phase in an AC circuit) that make up the conductor 160.

The sensing device 140, 141 can include one or more Rogowski coils. Generally, Rogowski coils are designed with two wire loops connected in electrically opposite directions. This cancels electromagnetic fields coming from outside the coil loop. One or both loops can consist of wound wire. If only one loop is constructed as a winding, then the second wire loop can be constructed by returning the wire through or near this winding. If both loops are constructed as windings, then they must be wound in opposite directions. Two windings can be laid on top of each other or next to each other. There are different Rogowski coil designs such as split-core or non-split-core style. A Rogowski coil can be rigid or flexible. Rogowski coils are wound over a non-magnetic core, usually having toroidal shape. This core may be made of plastic, epoxy, and/or other insulating material. The coil then may be formed around a conductor 160, where the current in the conductor 160 is measured. The voltage that is induced in the Rogowski coil is proportional to the rate of change of current in the conductor 160. This rate of change of current can be called the first time derivative of the current, or di/dt, or change in current per change in time. Thus, the output of the Rogowski coil can be used to represent di/dt where "i" is the current in the conductor 160 being measured. Also, the output of a Rogowski coil can be connected to an electronic integrator circuit to provide a signal that is proportional to the sensed current.

Rogowski coils can provide low inductance and excellent response to fast-changing currents since they have air cores rather than an iron core. Without an iron core to saturate, a Rogowski coil can be highly linear even in high current applications. Furthermore, having reduced saturation concerns, a sensing device 140, 141 and associated protective device 150, 151 using a Rogowski coil can employ a single slope response with increased sensitivity. Also, the geometry of a Rogowski coil may provide a sensing device 140, 141 that is significantly immune to electromagnetic interference. In certain example embodiments, the effect of a spike can be more pronounced when using a Rogowshi coil in the sensing device 140, 141 because the Rogowski coil is frequency-dependent, which means that the Rogowski coil can amplify higher frequencies with a linear relationship between the coil output signal and frequency.

The power harvested by the sensing device 140, 141 from the conductor 160 and the resulting input signal delivered to the corresponding protective device 150, 151 can generate the power required to operate one or more components (e.g., the hardware processor) of the protective device 150, 151. In addition, or in the alternative, one or more components of the protective device 150, 151 can be powered from a separate auxiliary power source (not shown), which can include but is not limited to 120 VAC service and/or a battery. Part of the protective device 150, 151 in FIG. 1 is electrically and/or communicably coupled to the user 190 using conductor 180. Specifically, conductor 180 electrically couples the protective devices 150, 151 to the user 190 and each other. Conductor 180 can be a conductor delivering control power (as described above with respect to conductor 170, such as a fiber optic cable or an Ethernet system), a wireless communication system, or any combination thereof. In certain example embodiments, conductor 180 is the same as conductor 170.

Details of the components of the protective devices 150, 151 are described below with respect to FIG. 2. In general, each protective device 150, 151 communicates with the user 190 to receive instructions (e.g., new settings) and/or to notify the user 190 that a trip signal has been sent to a breaker 120, 121. (e.g., new settings) trip signal when a fault condition is detected by the protective device 150, 151. When the breaker 120, 121 operates (opens) in response to a trip signal generated by a protective device 150, 151, one or more circuits are opened to prevent the condition causing the fault from causing damage to one or more components in the system 100.

In certain example embodiments, the protective device 150, 151 monitors for a fault condition and, when a fault condition exists, both sends the trip signal to the breaker 120, 121 and sends a notification to the user 190 that the trip signal was sent. In such a case, the protective device 150, 151 can generate and send a trip signal that is sent directly to the breaker 120, 121. The protective device 150, 151 can also send a trip signal to the user 190 for information purposes. In such a case, when the trip signal is generated and sent, the protective device 150, 151 is said to operate.

Generally, when a protective device 150, 151 generates and sends a trip signal, one or more devices (e.g., breaker 120, 121) in the system 100 are electrically isolated. In addition, each protective device 150, 151 can be electrically and/or communicably coupled to each other using the conductor 170. In such a case, the protective devices 150, 151 can send signals measured by their respective sensing devices 140, 141 to each other to determine if a fault condition exists. For example, protective device 150 can receive the signal measured by sensing device 141 and sent by protective device 151 to compare such signal with the signal measured by sensing device 140 to determine if the differential current (in this case, the input signal for protective device 150) exceeds a differential current threshold level.

Each protective device 150, 151 can monitor one or more of a number of different electrical conditions, also called a fault or fault condition. One such electrical condition is an overcurrent condition. In one example embodiment, an overcurrent condition is where one or more conductors 160 transmitting power carries a current that is too high (i.e., has too many amperes) relative to a threshold current. For example, if a threshold current is 120 Amperes (A) and the current flowing through a conductor 160 is 220 A, then an overcurrent condition exists. An overcurrent condition can also be caused by one or more of a number of other conditions, including but not limited to excessive power demand by a load, internal dielectric degradation, and/or an internal short circuit in an electrical connector.

In certain example embodiments, a user 190 is communicably coupled to one or more of the protective devices 150, 151. A user 190 can be any person that interacts with the system 100 that includes a protective device 150, 151. Examples of a user 190 can include, but are not limited to, an electric distribution company, an electric transmission company, a public utility, a control room operator, a load management system, an engineer, an electrician, an instrumentation and controls technician, a mechanic, an operator, a consultant, a contractor, and a manufacturer's representative.

A user 190 can communicate with a protective device 150, 151 using a physical interaction (e.g., touching a touch pad on the protective device 150) and/or using a user system (not shown). In cases where a user 190 uses a user system to communicate with a protective device 150, 151, the user system can use wired and/or wireless technology. The user system is described more fully below with respect to FIG. 2 and the application interface of the protective device.

Figure 2:
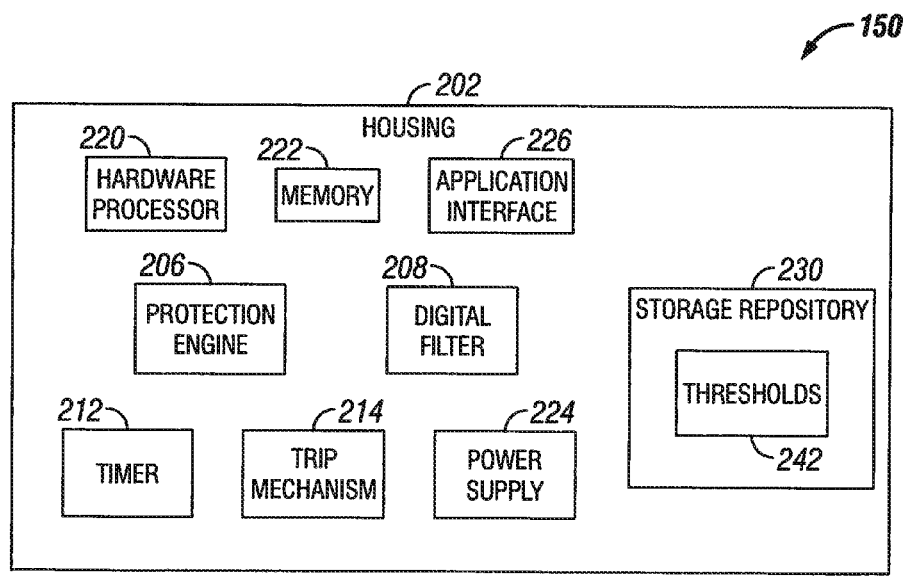
FIG. 2 shows an example protective device in accordance with certain example embodiments.

FIG. 2 shows an example protective device 150 in accordance with certain example embodiments. The example protective device 150 of FIG. 2 includes a housing 202, inside of which can include a power source 204, a protection engine 206, a digital filter 208, a timer 212, a trip mechanism 214, a hardware processor 220, memory 222, an application interface 226, and a storage repository 230 that includes thresholds 242. In one or more embodiments, one or more of the components shown in FIG. 2 can be omitted, repeated, and/or substituted. Accordingly, embodiments of protective devices should not be considered limited to the specific arrangements of components shown in FIG. 2.

In certain example embodiments, the housing 202 is a type of enclosure houses one or more of the components of the protective device 150. The housing 202 can have a movable portion that allows a user to access the one or more components of the protective device 150 located inside the housing 202. The housing 202 can be made of one or more of a number of suitable materials, including but not limited to plastic, metal, glass, and rubber. The housing 202 can be mounted in one or more locations when connected to the system 100. For example, the housing 202 can be mounted in or near a compartment that houses the corresponding breaker 120. As another example, the housing 202 can be mounted in or near a central relay station.

In certain example embodiments, the power supply 224 is operatively coupled to the hardware processor 220 and any other components of the protective device 150. The power supply 224 can be one or more sources of energy (e.g., electricity) used to provide power and/or control to the hardware processor 220 and/or any other component of the protective device 150. The power supply 224 typically provides electricity that is in AC format and/or DC format. The power supply 224 can be physically separate from the other components of the protective device 150 and/or internal within the housing 202 of the protective device 150.

The amount of power delivered by the power supply 224 to the hardware processor 220 can be any amount suitable to operate the hardware processor 224. In certain example embodiments, the power delivered by the power supply 224 is transformed, rectified, inverted, and/or otherwise manipulated, at the power supply 224, so that the hardware processor 220 and/or other various components of the protective device 150 receive a proper voltage and/or current level to operate properly. In certain example embodiments, the signal received from a sensing device 140, 141 acts as the power supply 224 by providing power to the hardware processor 220 and/or other components of the protective device 150.

In certain example embodiments, the power supply 224 can be a battery. The battery can provide power to the hardware processor 220 and/or other components of the protective device 150 on a constant basis or as backup power when a different power supply 224 fails. The battery and/or power supply 224 can be disposed inside of the housing 202, affixed to the housing 202, or placed in a location remote from the housing 202. The power supply 224 and/or the battery can be electrically coupled to the hardware processor 220 and/or other components of the protective device 150 using a wired and/or wireless technology.

The hardware processor 220 receives power from the power source 224 and is communicably coupled, at least, to the timer 212, the application interface 226, the memory 222, and the protection engine 206. In general, the protection engine 206, using one or more instructions executed on the hardware processor 220 and using software stored in the memory 222, determines whether a power spike (input signal) exceeds a threshold 242 and, if so, simultaneously initiates an initial time period and a longer latch timer period, replaces the input signal with a set value signal during the initial time period, and after the initial time period and during the duration of the latch time period, prevents the input signal from being replaced by the set value signal. If a trip signal is subsequently sent to a breaker 120, 121, the protection engine 206 can also use the application interface 226 and the conductors 170 to inform the user 190 that the trip signal was sent.

The example hardware processor 220 within the housing 202 of the protective device 150 is configured to execute software in accordance with one or more example embodiments. Specifically, the hardware processor 220 is configured to execute the instructions used to operate the protection engine 206 and/or any other components within the protective device 150. The example hardware processor 220 is an integrated circuit, a central processing unit, a multi-core processing chip, a multi-chip module including multiple multi-core processing chips, or other hardware processor. The hardware processor 220 can be known by other names, including but not limited to a computer processor, a microcontroller, a microprocessor, and a multi-core processor.

In one or more example embodiments, the hardware processor 220 is configured to execute software instructions stored in the memory 222 of the protective device 150. The example memory 222 can include one or more cache memories, main memory, and/or any other suitable type of memory. In certain example embodiments, the memory 222 is discretely located within the housing 202 relative to the hardware processor 220. In certain configurations, the memory 222 can also be integrated with the hardware processor 220. The hardware processor 220 can be integrated into one or more mixed signal integrated circuits. In such a case, the profile and/or cost of the hardware processor 220 can be reduced.

In certain example embodiments, the protection engine 206 of the protective device 150 coordinates the digital filter 208, the timer 212, and the trip mechanism 214. Specifically, the protection engine 206 sends data (e.g., signals, instructions) to the filter digital 208, the timer 212, and the trip mechanism 214. Similarly, the protection engine 206 receives data (e.g., input signal, time) from the digital filter 208, the timer 212, and the trip mechanism 214. More specifically, the protection engine 206 receives, using the application interface 226, one or more input signals (e.g., current) from the sensing devices 140, 141.

The protection engine 206 can continually read the input signals or sample the input signals. When the protection engine 206 samples the input signals, the sampling rate can be based on one or more of a number of factors, including but not limited to a default sampling rate, a sampling rate defined by the user 190, a sampling rate stored in the storage repository 230, some other factor, or any combination thereof. An example of a sampling rate is 16 samples per cycle. The sampling rate can be random or substantially constant. In certain example embodiments, the sampling rate is the same for all types (raw signals, filtered signals, etc.) of input signals used herein.

In certain example embodiments, the protection engine 206 receives an input signal and determines whether the input signal exceeds one or more threshold values. The threshold values can be among the thresholds 242 stored in the storage repository 230. Specifically, the protection engine 206 determines which threshold values are needed, retrieves those threshold values from the thresholds 242 in the storage repository 230, and compares the input signal to the threshold values to determine if the input signal exceeds a threshold value. When the protection engine 206 determines that the input signal exceeds a threshold value, the input signal could be the start of a fault condition or merely a power spike. In either case, upon determining that the input signal exceeds a threshold value, the protection engine 206 sends an instruction (signal) to the timer 212 to start measuring an initial time period and a latch time period.

In certain example embodiments, the timer 212 tracks clock time and/or tracks one or more time periods, such as the initial time period and the latch time period. The example timer 212 is able to track one or more time periods concurrently. The timer 212 can be part of the hardware processor 220. The timer 212 can track time periods based on an instruction received from the protection engine 206, based on an instruction received from the user 190, based on an instruction programmed in the software for the protective device 150, 151, based on some other condition, or from any combination thereof.

The latch time period can be longer than the initial time period. For example, the latch time period can be approximately 0.07 seconds, while the initial time period can be several milliseconds, such as approximately 0.01 seconds. A time period can be measured in seconds and/or in one or more other measurements. For example, for a circuit with AC power, the initial time period can be half cycles. The duration of each time period (e.g., the initial time period, the latch time period) can be stored in the timer 212 and/or in the storage repository 230. The duration of each time period can be set by default, by a user 190, by software instructions, by the protection engine 206, and/or by any other suitable means. In certain example embodiments, the initial time period is no more than one cycle. When a time period has ended (expired, lapsed), the timer 212 sends a signal to the protection engine 206 to notify the protection engine 206 that such a time period has ended.

In certain example embodiments, when the protection engine 206 instructs the timer 212 to start measuring an initial time period, the protection engine 206 replaces the input signal with a set value signal during the initial time period. The set value signal is an artificial signal that has a predetermined value that is less than the threshold values used to compare with the input signals. Such set value signal can be stored in the storage repository 230 and retrieved by the protection engine 206 when the protection engine 206 determines that the input signal exceeds a threshold value. In certain example embodiments, the protection engine 206 replaces the input signal with the set value signal and compares the set value signal with the threshold values for the duration of the initial time period.

When the timer 212 notifies the protection engine 206 that the initial time period has ended, the timer 212 continues to measure the latch time period because the latch time period is longer than the initial time period. When the protection engine 206 receives the notification from the timer 212 that the initial time period has ended, the protection engine 206 prevents further replacement of the input signal with the set value signal. In certain example embodiments, the protection engine 206 prevents further replacement of the input signal with the set value signal until the protection engine 206 receives notification from the timer 212 that the latch time period has ended.

In addition, when the protection engine 206 receives the notification from the timer 212 that the initial time period has ended, the protection engine 206 resumes comparing the input signal with the threshold value. Alternatively, during the duration of the latch time period after the initial time period has ended, the protection engine 206 does not compare the input signal with the threshold value. In such a case, the protection engine 206 resumes comparing the input signal with the threshold value when the latch period ends.

In certain example embodiments, the protection engine 206 sends the input signal (i.e., the set value signal during the initial time period and the input signal at all other times) to the digital filter 208. After being processed by the digital filter 208, the input signal becomes a filtered input signal (or simply a filtered signal). The protection engine 206 (or some other engine of the protection device 150, 151) then receives the filtered input signal, filtered by the digital filter 208, and compares the filtered input signal with the threshold values to determine whether the filtered input signal exceeds a threshold value (i.e., whether a fault exists).

If the protection engine 206 determines that the filtered input signal does not exceed a threshold value during the remainder of the latch period, then the filtered input signal is within a normal range, and the initial excursion detected in the input signal by the protection engine 206 (causing the timer 212 to start measuring the initial time period and the latch time period) was merely an isolated power spike. On the other hand, if the protection engine 206 determines that the filtered input signal exceeds a threshold value during the remainder of the latch period, then the filtered input signal is part of a fault condition. In such a case, the protection engine 206 instructs the trip mechanism 214 to generate a trip signal and send the trip signal to a breaker 120, 121. Optionally, in certain example embodiments, the trip mechanism 214 can also generate an information notification for a user 190, indicating that a trip signal was sent to a breaker 120, 121.

Continuing with FIG. 2, the protective device 150 interacts with the user 190 using an application interface 226 in accordance with one or more example embodiments. Specifically, the application interface 226 of the protective device 150 receives input from and sends output to the user 190. The user 190 can include an interface to receive data from and send data to the protective device 150 in certain example embodiments. Examples of this interface include, but are not limited to, a graphical user interface, an application programming interface, a keyboard, a monitor, a mouse, a web service, a data protocol adapter, some other hardware and/or software, or any suitable combination thereof.

In one or more embodiments of the invention, the information received by the application interface 226 includes, but is not limited to, relay settings and thresholds 242. The information sent by the application interface 226 can include, but is not limited to, a notification that a trip signal has been sent to a breaker 120, 121. The information sent by the application interface 226 specifies, but is not limited to, a user 190, a field location, a data source, a Uniform Resource Identifier (URI) (e.g., a Uniform Resource Locator (URL), a web address, etc.), data identified by and/or requested by the protection engine 206, some other software or source of information, or any suitable combination thereof.

In one or more embodiments of the invention, the information (i.e., data) transferred among the application interface 226, the user 190 corresponds to metadata associated with such information. In this case, the metadata describes the data specified the metadata provides context for the specified data). In one or more embodiments of the invention, the protective device 150 supports various data formats provided by the user 190.

Continuing with FIG. 2, the protective device 150 retrieves and stores thresholds 242. More specifically, the protective device 150 uses the protection engine 206 to retrieve and store thresholds 242 in the storage repository 230 in accordance with one or more example embodiments. In one or more example embodiments, the thresholds 242 of the storage repository 230 are a measure of one or more of a number of data points and/or parameters. Specifically, the thresholds 242 represent values or ranges of values that measure the strength of a data point (e.g., the magnitude of an input signal). The storage repository 230 can also store one or more of a number of other types of data, including but not limited to filter algorithms, comparison algorithms, and time periods.

The storage repository 230 can be a persistent storage device (or set of devices) that stores software and data used to assist the protection engine 206 in determining a threshold to compare against an input signal received from a sensing device 140. In one or more example embodiments, the storage repository 230 stores the thresholds 242. Examples of a storage repository 230 include, but are not limited to, a database (or a number of databases), a file system, a hard drive, some other form of data storage, or any suitable combination thereof. The storage repository 230 is located on multiple physical machines, each storing all or a portion of the thresholds 242 according to some example embodiments. Each storage unit or device is physically located in the same or different geographic location.

The storage repository 230 can be operatively connected to the protection engine 206 and the digital filter 208. In one or more example embodiments, the protection engine 206 includes functionality to receive an input signal (or, more simply, a signal) from a sensing device 140, 141, determine that an input signal exceeds a corresponding threshold value from the thresholds 242 stored in the storage repository 230, start the timer 212 to measure an initial time period and a latch time period, replace the input signal with a set value signal during the initial time period, prevent the input signal from being replaced with the set value signal during the remainder of the latch time period (after the initial time period ends), and repeat the process after the remainder of the latch time period ends.

The functions of the protection engine 206 using example embodiments can be performed on a single computing device or on multiple computing devices. Further, the functions of the protection engine 206 can be performed on the same computing device that performs the functions (e.g., digital filtering, fault detection using a filtered signal) of a protective device currently known in the art. When the functions of the protection engine 206 are performed on multiple computing devices, a number of configurations and/or frameworks are used in certain example embodiments. The configurations and/or software frameworks are designed to work with multiple data nodes and large quantities of data. One or more calculations performed by one or more components of the protection engine 206 are performed on multiple machines operating in parallel, where the results from each machine are combined to generate a result to the one or more calculations.

Each component of the protective device 150 described herein (e.g., the protection engine 206, the trip mechanism 214) uses one or more algorithms to perform one or more calculations. Each algorithm is designed to receive specific types of data and generate one or more specific results using such data. A specific result is a number, a range of numbers, a rating, and/or some other suitable output according to some example embodiments. Each algorithm is fixed, variable, self-adjusting, or otherwise changed. Each algorithm uses one or more pieces of data from one or more areas of data (e.g., thresholds 242).

In one or more embodiments of the invention, the protection engine 206 of the protective device 150 coordinates the digital filter 208, the timer 212, the trip mechanism 214, and the storage repository 230. Specifically, the protection engine 206 coordinates the transfer of information between the application interface 226, the storage repository 230, and the other components of the protective device 150 according to certain example embodiments.

Figure 3A:
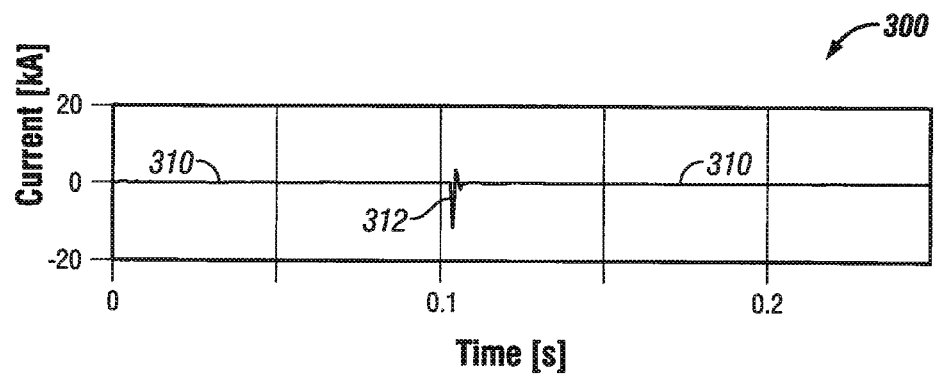
FIG. 3A-C show various graphs of an input signal for an example protective device in accordance with certain example embodiments.
Figure 3B:
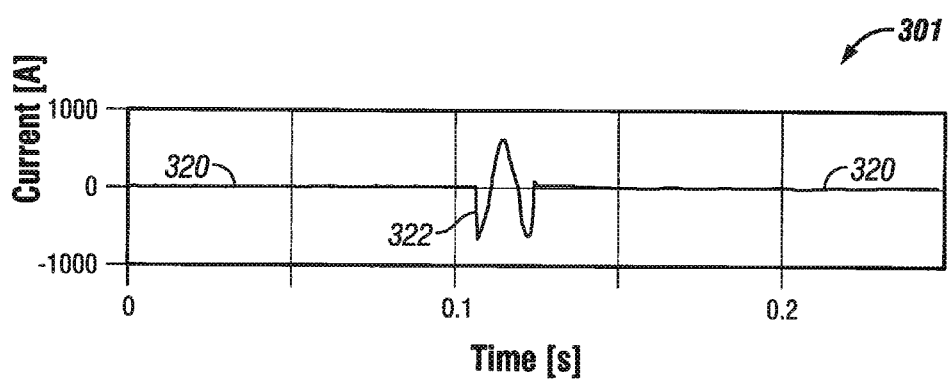
Figure 3C:
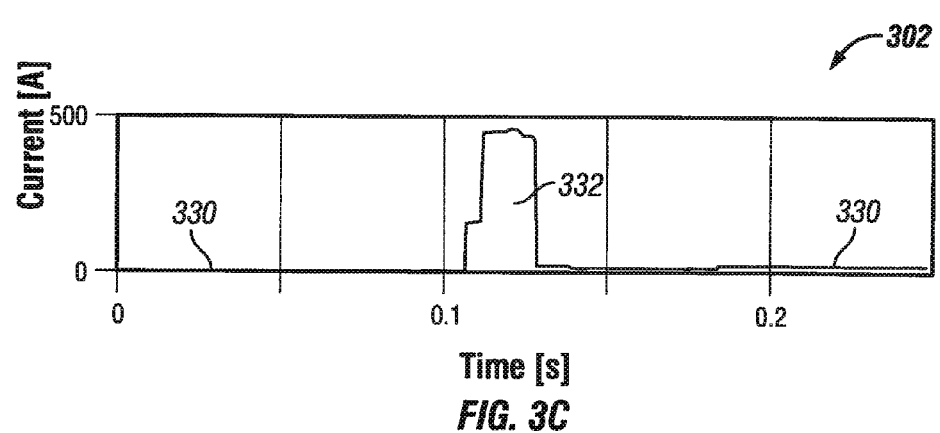

FIG. 3A-C show various graphs of signals for an example protective device in accordance with certain example embodiments. Referring to FIGS. 1-3C, the input signal of FIGS. 3A-C includes different versions of a power spike that is not part of a fault. For example, the power spike can be generated by closing a breaker 120. FIG. 3A shows a graph 300 of the signal 310 with the power spike 312 in raw form. The signal 310 and corresponding power spike 312 of FIG. 3A is measured by the sensing device 140 located in proximity to the breaker 120. The power spike 312 corresponds to an operation of (closing) the breaker 120. The power spike 312 lasts for approximately one half of one cycle and starts just after 0.1 seconds. The power spike 312 peaks at approximately −13 kA. Prior to and shortly after the power spike 312, the current of the signal 310 is at a normal level (approximately close to one kA, although normal operating current can vary depending on the system components).

In the graph 301 in FIG. 3B, a filtered version of the signal 320 is shown after going through the digital filter 208 of the protective device 150. In this case, the filter extends the length (approximately 0.0167 seconds, or one cycle) and decreases the magnitude (approximately 750 A) of the power spike 322. Again, the signal 320 is at a normal level prior to and shortly after the power spike 322.

FIG. 3C shows a graph 302 of a differential current 330 (derived by the protective device 150) comparing the filtered signal 320 of FIG. 3B and a filtered signal measured by the sensing device 141 and digitally filtered by the digital filter 208. The filtered signal measured by the sensing device 141 can be filtered by the digital filter 208 of protective device 150 or by the digital filter 208 of protective device 151. In either case, the signal measured by the sensing device 141 is sent from protective device 151 to protective device 150 using conductor 180.

The differential current 330 of FIG. 3C can be generated by the protection engine 206 of the protective device 150. The power spike 332 of the differential current 330 has approximately the same duration and magnitude as the power spike 322 shown in FIG. 3B. This means that the effects of the breaker 120 closing, as measured by the sensing device 140, did not travel along the conductor 160 to reach sensing device 141 to be measured. In other words, the power spike created by the operation of the breaker 120 has a stronger magnitude at the sensing device 140 and a lower magnitude at the sensing device 141.

Figure 4:
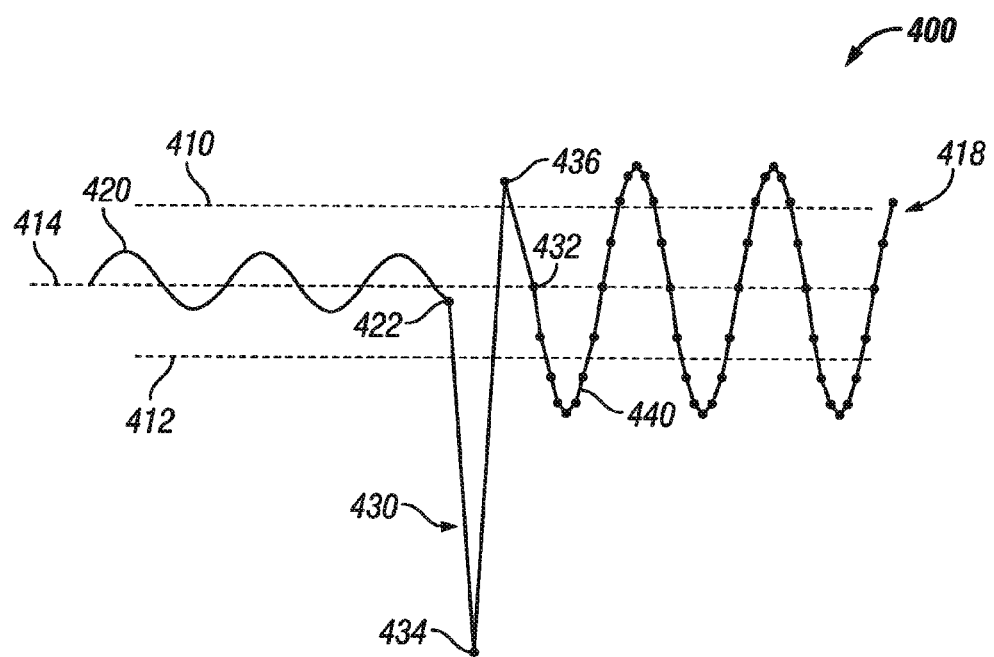
FIG. 4 shows a graph of an input signal that includes a spike and fault condition in accordance with certain example embodiments.

FIG. 4 shows a graph 400 of a raw signal 418 that includes a spike 430 and fault condition 440 in accordance with certain example embodiments. The graph 400 shows a zero axis 414 (depicting a zero value of the raw signal 418), as well as a positive threshold value 410 and a negative threshold value 412 spaced equidistantly above and below the zero axis 414, respectively. The raw signal 418 has a normal shape in a steady-state condition 420 until a time corresponding to point 422, where a power spike 430 occurs. The power spike 430 has negative peak 434 that exceeds the negative threshold value 412 and a positive peak 436 that exceeds the positive threshold value 410.

The power spike 430 lasts approximately one half of one cycle until a time corresponding to point 432. After the time corresponding to point 432, the raw signal 418 has an amplified shape associated with a fault condition 440. The amplified shape 440 is symmetrical and cyclic, similar to the normal shape 420. However, the magnitude of the amplified shape of the fault condition 440 is greater than the amplitude of the normal shape of the steady-state condition 420 such that the apexes of the fault condition 440 exceed the positive threshold value 410 at the positive portions of the fault condition 440 and exceed the negative threshold value 412 at the negative portions of the fault condition 440.

In certain example embodiments, a power spike 430 can exist as a precursor to a fault condition 440 or in the absence of a fault condition 440 (as during a normal breaker operation). If the power spike 430 exists as a precursor to a fault condition 440, the input signal for the subsequent time after the power spike 430 (e.g., after point 432 in FIG. 4) can simply be called a fault 440.

Figure 5:
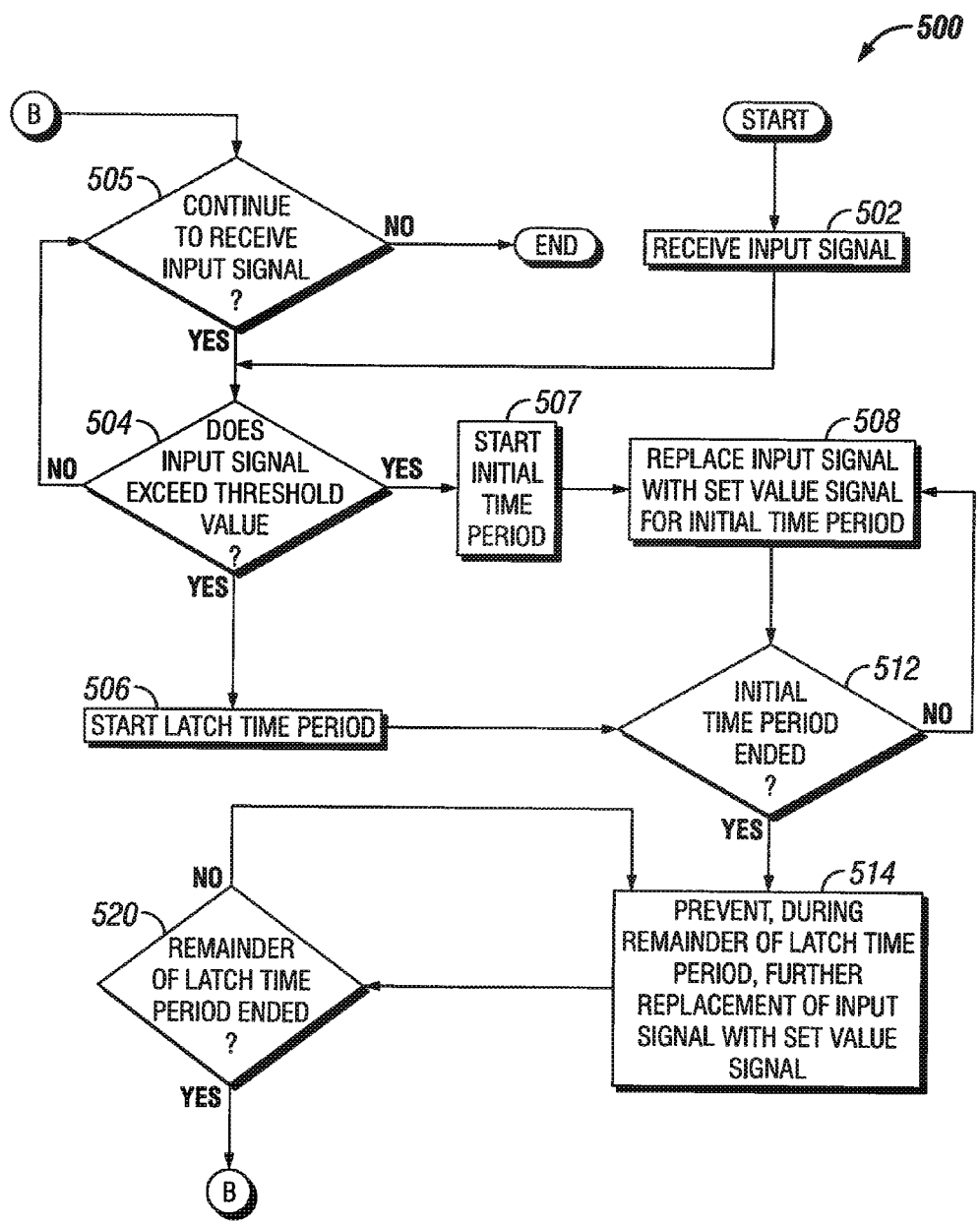
FIG. 5 shows a flowchart of a method for mitigating the effect of a power spike on a protective device.

FIG. 5 shows a flowchart of a method 500 for mitigating the effect of a power spike on a protective device in accordance with certain example embodiments. While the various steps in these flowcharts are presented and described sequentially, one of ordinary skill will appreciate that some or all of the steps may be executed in different orders, may be combined or omitted, and some or all of the steps may be executed in parallel. Further, in certain example embodiments, one or more of the steps described below may be omitted, repeated, and/or performed in a different order.

In addition, a person of ordinary skill in the art will appreciate that additional steps, omitted in FIG. 5, may be included in performing these methods. Accordingly, the specific arrangement of steps shown in FIG. 5 should not be construed as limiting the scope. In addition, a particular computing device, as described, for example, in FIG. 6 below, may be used to perform one or more of the steps for the method 500 described below.

Referring now to FIGS. 1-5, one example method 500 begins at the START step and continues to step 502. In step 502, an input signal is received. The input signal can be a raw (unfiltered) signal. In certain example embodiments, one or more components of the protective device 150, 151 are used to process the signal sent by the sensing device 140, 141 to generate the input signal. For example, the digital filter 208 can be used to filter the raw (unfiltered) signal and generate the input signal, also called in this case a filtered signal. The input signal can be originated by a measuring device 140, 141 and received by a protective device 150, 151.

In step 504, a determination is made as to whether the input signal exceeds a threshold value. The threshold value is among the thresholds 242 stored in the storage repository 230. The threshold value can be retrieved by the protection engine 206. In certain example embodiments, the protection engine 206 compares the input signal and the threshold value and determines whether the input signal exceeds the threshold value. The threshold value can be a range of values. The threshold value can be a positive value, a negative value, or an absolute value. As an example, the threshold value is exceeded if the input signal is greater than the absolute value of the threshold value.

If the threshold value is a minimum threshold value, then the threshold value is exceeded if the input signal is less than the minimum threshold value. The threshold value can be some multiple (e.g., at least two, ten, fifteen) times greater than an average of the input signal prior to the initial time period. If the input signal exceeds the threshold value, then the process proceeds to steps 506 and 507 at substantially the same time. If the input signal does not exceed the threshold value, then the process proceeds to step 505.

In step 505, a determination is made as to whether the input signal continues to be received. The input signal can be the same or a different input signal compared to that received in step 502 above. In certain example embodiments, the input signal is a continuous signal. The input signal can be generated by one or more sensing devices 140, 141 and received by one or more protective devices 150, 151. The one or more protective devices 150, 151 can determine whether the input signal continues to be received. If the input signal continues to be received, then the process reverts to step 504. In such a case, the process forms a continuous loop between steps 504 and 505 until the input signal is no longer received or until the input signal exceeds a threshold value. If the input signal is no longer received, then the method 500 ends at the END step.

In step 506, the latch time period is started. The latch time period is started and measured by the timer 212. In certain example embodiments, the protection engine 206 sends a command to the timer 212 to start measuring the latch time period. The latch time period can be set and/or adjusted by default, by a user 195, by the control center 190, some other component, and/or by the protection engine 206 according to software instructions. The latch time period can be any period of time that allows the protection engine 206 to analyze the input signal to determine whether a fault condition truly exists. For example, the latch time period can be approximately 0.07 seconds.

In step 507, an initial time period is started. The initial time period is started and measured by the timer 212. In certain example embodiments, initial time period and the latch time period are started at substantially the same time. The initial time period can be shorter than the latch time period. The protection engine 206 can send a command to the timer 212 to start measuring the initial time period. The initial time period can be set and/or adjusted by default, by a user 190, some other component, and/or by the protection engine 206 according to software instructions.

The initial time period can be any period of time that would reduce or eliminate the effects of a power spike on a filtered signal flowing through the logic of the protective device 206. Specifically, the initial time period can be of such a duration that the protection engine 206 does not instruct the trip mechanism 214 to generate and send a trip signal when an isolated power spike is received from a sensing device 140, 141. At the same time, the initial time period can be of such a duration that the protection engine 206 does instruct the trip mechanism 214 to generate and send a trip signal when a power spike received from a sensing device 140, 141 is the beginning of a fault. For example, the initial time period is no more than approximately one cycle. As another example, the initial time period is no more than approximately 0.008 seconds.

In step 508, the input signal is replaced with a set value signal for the initial time period. In certain example embodiments, the set value signal has a value that is less than the threshold value. For example, the set value signal can have a value of zero. As another example, the set value signal can have a value (e.g., maximum, minimum) that is equal to approximately the average of the input signal prior to the start of the initial time period. The set value signal can be determined by the protection engine 206. The set value signal can be constant, sinusoidal, sawtooth-shaped, some other regular and/or repeatable shape, or some random shape.

In step 512, a determination is made as to whether the initial time period has ended. In certain example embodiments, the timer 212 measures the initial time period and sends a notification to the protection engine 206 that the initial time period has ended. Because the latch time period is longer than the initial time period, and because the latch time period and the initial time period start at substantially the same time, a reminder of the latch time period exists when the initial time period has ended. If the initial time period has not ended, the process reverts to step 508. In such a case, the process forms a continuous loop between steps 508 and 512 until the initial time period ends. If the initial time period has ended, then the process proceeds to step 514.

In step 514, further replacement of the input signal with the set value signal is prevented. In other words, the input signal is again evaluated, in its unfiltered state as received from the sensing device 140, 141 (and in some cases, subsequently from an analog filter), after the initial time period. In certain example embodiments, the further replacement of the input signal with the set value signal is prevented during the remainder of the latch time period. The further replacement of the input signal with the set value signal can be prevented by the protection engine 206.

In step 520, a determination is made as to whether the latch time period has ended. In certain example embodiments, the timer 212 measures the latch time period and sends a notification to the protection engine 206 that the latch time period has ended. If the latch time period has not ended, the process reverts to step 514. In such a case, the process forms a continuous loop between steps 514 and 520 until the latch time period ends. If the latch time period has ended, then the process reverts to step 505. In such a case, subsequent power spikes can cause the method 500 to repeat one or more times. On each occasion that the method 500 repeats, some distinguishing term (e.g., subsequent) can be used to differentiate each time that the method 500 is used to mitigate the effect of a power spike on a protective device 150, 151.

Figure 6:
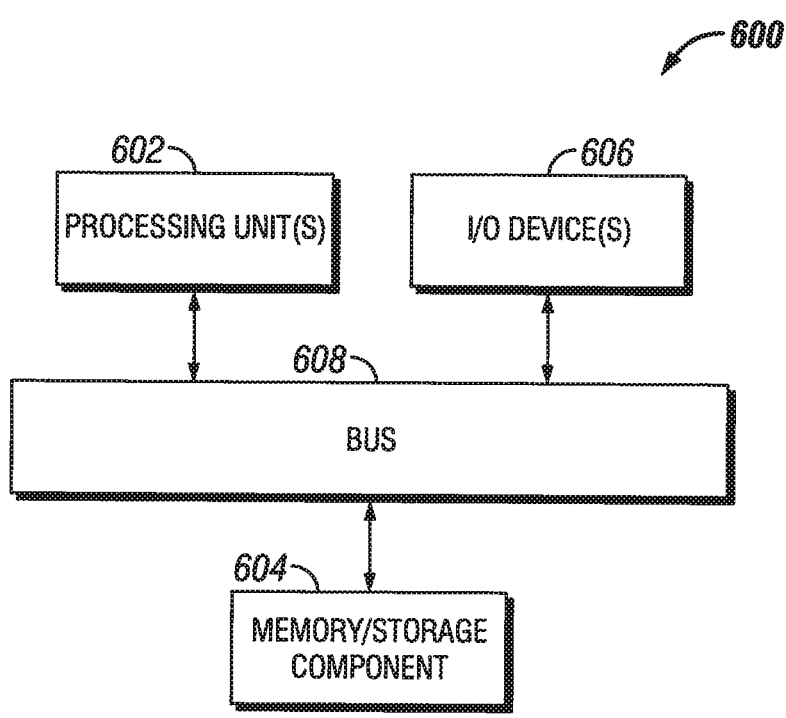
FIG. 6 shows a computer system used with an example protective device in accordance with certain example embodiments.

FIG. 6 illustrates one embodiment of a computing device 600 capable of implementing one or more of the various techniques described herein, and which may be representative, in whole or in part, of the elements described herein. Computing device 600 is only one example of a computing device and is not intended to suggest any limitation as to scope of use or functionality of the computing device and/or its possible architectures. Neither should computing device 600 be interpreted as having any dependency or requirement relating to any one or combination of components illustrated in the example computing device 600. As shown in FIG. 6, the bus 608 is operatively coupled to each of the processing unit(s) 602, the I/O device(s) 606, and the memory/storage component 604.

Computing device 600 includes one or more processors or processing units 602, one or more memory/storage components 604, one or more input/output (I/O) devices 606, and a bus 608 that allows the various components and devices to communicate with one another. Bus 608 represents one or more of any of several types of bus structures, including a memory bus or memory controller, a peripheral bus, an accelerated graphics port, and a processor or local bus using any of a variety of bus architectures. Bus 608 can include wired and/or wireless buses.

Memory/storage component 604 represents one or more computer storage media. Memory/storage component 604 may include volatile media (such as random access memory (RAM)) and/or nonvolatile media (such as read only memory (ROM), flash memory, optical disks, magnetic disks, and so forth). Memory/storage component 604 can include fixed media (e.g., RAM, ROM, a fixed hard drive, etc.) as well as removable media (e.g., a Flash memory drive, a removable hard drive, an optical disk, and so forth).

One or more I/O devices 606 allow a customer, utility, or other user to enter commands and information to computing device 600, and also allow information to be presented to the customer, utility, or other user and/or other components or devices. Examples of input devices include, but are not limited to, a keyboard, a cursor control device (e.g., a mouse), a microphone, and a scanner. Examples of output devices include, but are not limited to, a display device (e.g., a monitor or projector), speakers, a printer, and a network card.

Various techniques may be described herein in the general context of software or program modules. Generally, software includes routines, programs, objects, components, data structures, and so forth that perform particular tasks or implement particular abstract data types. An implementation of these modules and techniques may be stored on or transmitted across some form of computer readable media. Computer readable media may be any available non-transitory medium or non-transitory media that can be accessed by a computing device. By way of example, and not limitation, computer readable media may comprise "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

The computer device 600 may be connected to a network (not shown) (e.g., a local area network (LAN), a wide area network (WAN) such as the Internet, or any other similar type of network) via a network interface connection (not shown). Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means may take other forms, now known or later developed. Generally speaking, the computer system 600 includes at least the minimal processing, input, and/or output means necessary to practice one or more embodiments.

Further, those skilled in the art will appreciate that one or more elements of the aforementioned computer device 600 may be located at a remote location and connected to the other elements over a network. Further, one or more example embodiments may be implemented on a distributed system having a plurality of nodes, where each portion of the implementation (e.g., protection engine 206, hardware processor 220) may be located on a different node within the distributed system. In one or more embodiments, the node corresponds to a computer system. Alternatively, the node may correspond to a processor with associated physical memory. The node may alternatively correspond to a processor with shared memory and/or resources.

The following description (in conjunction with FIGS. 1 through 6) describes a few examples in accordance with one or more example embodiments. The examples are for mitigating the effect of a power spike on a protective device. Terminology used in FIGS. 1 through 6 is used in the provided example without further reference to FIGS. 1 through 6.

EXAMPLE 1

Figure 7A:
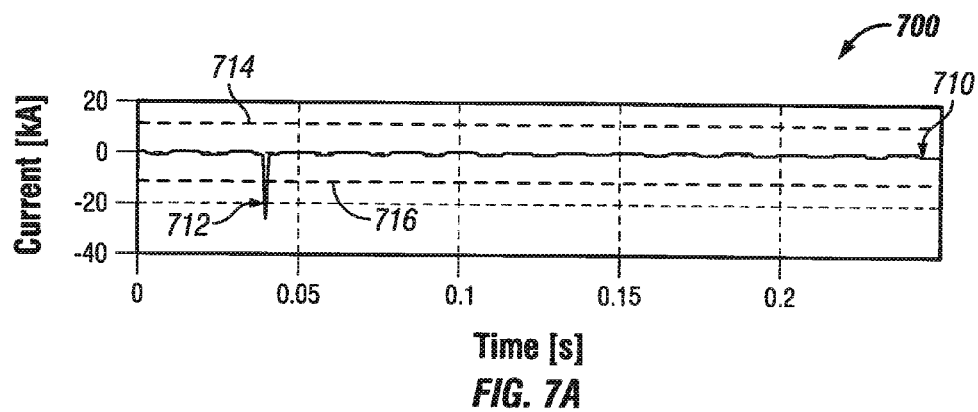
FIGS. 7A-F show various graphs of an example of an input signal that includes a power spike experienced by an example protective device in accordance with certain example embodiments.

Consider the following example, shown in FIGS. 7A through 7F, which describes mitigating the effect of a power spike on a protective device in accordance with one or more example embodiments described above. FIG. 7A shows a graph 700 of the raw (unfiltered) signal 710 received by a protective device 150 from a sensing device 140. The raw signal 710 is a steady state operating load current for all of the time shown in the graph 700 except for a negative power spike 712 at approximately 0.04 seconds. The magnitude of the power spike 712 (having a negative value) exceeds the threshold 716 (also having a negative value). The threshold 714 (having a positive value) is also shown on the graph 700.

Figure 7B:
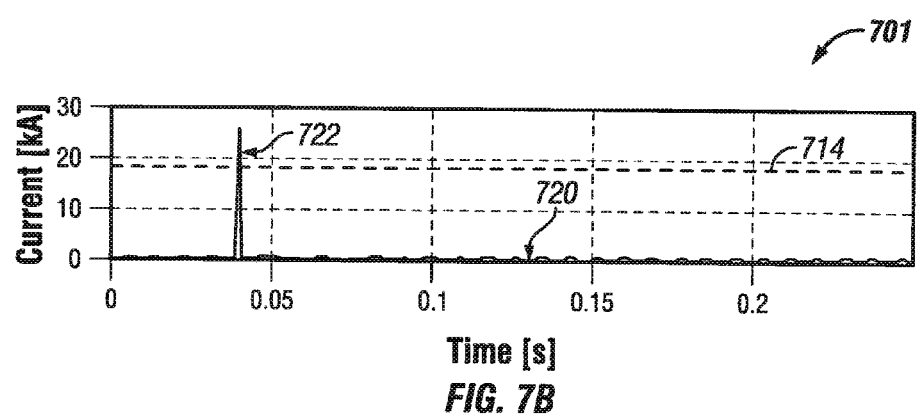

FIG. 7B shows a graph 701 of the absolute value of the raw signal 720 from FIG. 7A. Most of the absolute value of the raw signal 720 is at the steady state operating load current for all of the time shown in the graph 701 except for the power spike 722 at approximately 0.04 seconds. The magnitude of the power spike 722 exceeds the absolute value of the threshold 714.

Figure 7C:
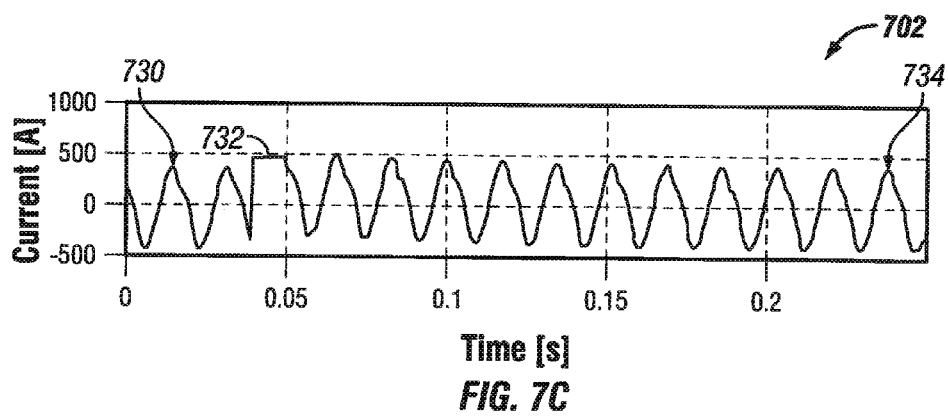
Figure 7D:
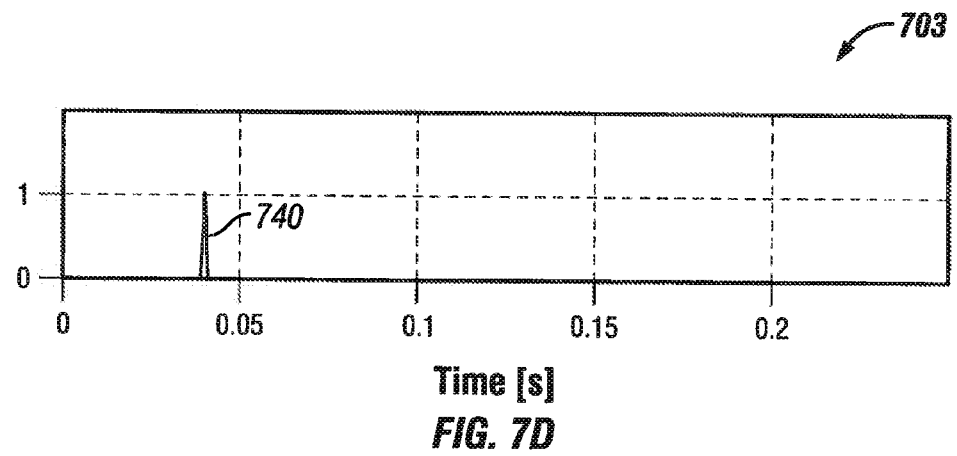
Figure 7E:
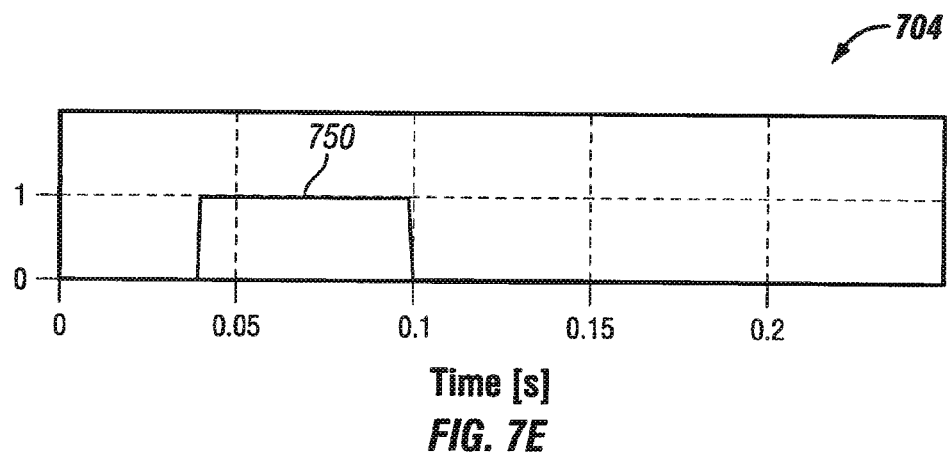

FIG. 7C shows a graph 702 of the signal using example embodiments described herein. Prior to the power spike 712 at approximately 0.04 seconds, the signal 730 is the input signal (not digitally filtered). Prior to approximately 0.04 seconds, the signal 730 represents normal operating conditions and does not exceed a threshold 714, 716. At approximately 0.04 seconds, when the power spike 712 occurs, example embodiments mitigate the effect of the power spike 712 on the protective device 150. Specifically, protection engine 206 determines that the input signal 712 has exceeded a threshold 716. This event is noted as spike 740 in the graph 703 shown in FIG. 7D.

Figure 7F:
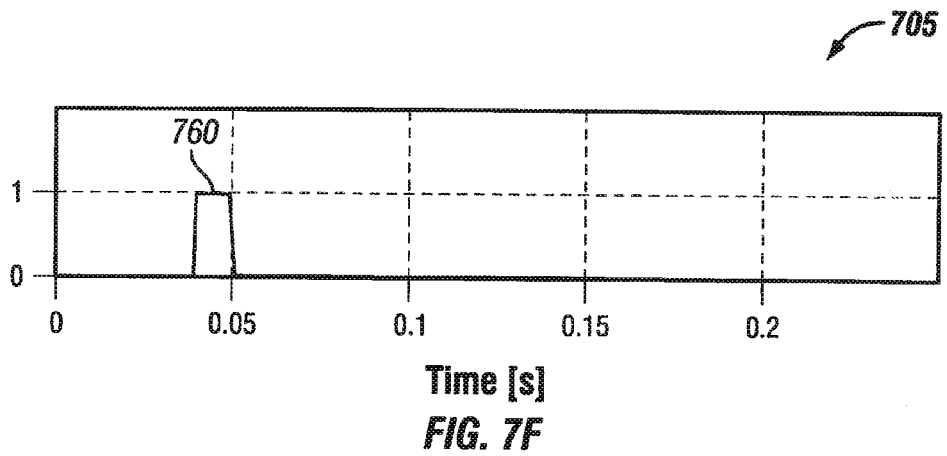

Once the protection engine 206 determines that the input signal 712 has exceeded a threshold 714, 716, the protection engine 206 sends a signal to the timer 212 to have the timer 212 start measuring a latch time period (shown in the graph 704 of FIG. 7E and lasting approximately 0.06 seconds) and an initial time period (shown in the graph 705 of FIG. 7F). During the initial time period 760, which lasts for approximately 0.008 seconds and covers approximately one half of one cycle of the input signal 710, the input signal is replaced with a set value signal. The set value signal 732 is shown in the graph 702 of FIG. 7C as a constant value that is approximately equal to the average peak of the input signal 730 before the power spike 712.

At the end of the initial time period, and during the remainder of the latch time period, starting at approximately 0.05 seconds on the timeline (after approximately 0.008 seconds after the power spike 712 is detected), the protection engine 206 stops replacing the input signal 730 with the set value signal 732 and prevents the input signal 710 from being replaced by the set value signal 732. During the initial time period 760 and the remainder of the latch time period 750 (which lasts for approximately 0.06 seconds), the protection engine 206 sends the input signal 710 (which, during the initial time period 760 is the set value signal 732) to the digital filter 208 to generate a filtered signal.

If the protection engine 206 determines that a fault exists during the remainder of the latch time period 750, then the protection engine 206 instructs the trip mechanism 214 to generate a trip signal. In such a case, the trip signal can be sent by the protective device to the breakers 120, 121 to trip (open) the breakers 120, 121. In certain example embodiments, the trip mechanism 214 and/or the protection engine 206 can also send a notification signal to the user 190 to notify the user 190 that the trip signal has been sent to a breaker 120, 121. When the breaker 120, 121 receives the trip signal, the breaker 120, 121 opens, causing one or more portions of the system 100 to become electrically isolated to isolate the fault and/or protect equipment from the fault.

When the latch time period 750 (lasting approximately 0.06 seconds) ends at approximately 0.1 seconds on the timeline, the protective device 150 continues to operate as it did at zero seconds. In other words, the protection engine 206 continues to compare the input signal 710 to the threshold values 714, 716 after 0.1 seconds. If, at some point after 0.1 seconds, the protection engine 206 detects another power spike, then the protective device 150 repeats the sequence described with respect to the time period between approximately 0.04 seconds and 0.1 seconds.

This example illustrates how an example embodiment of mitigating the effect of a power spike on a protective device works. Without example embodiments described herein, the protective device 150 could misoperate (trip without a fault condition) and generate an unnecessary trip signal because of the occurrence of the isolated power spike 712. Such an unnecessary trip signal would have caused unnecessary down time for one or more segments of the system 100 because the power spike 712 is not part of a fault condition, but rather is part of an isolated condition associated with, for example, a lighting strike or a breaker 120 switching close to the sensing device 140. However, because the protective device 150 includes example embodiments for mitigating the effect of a power spike on a protective device 150, as described herein, the protective device 150 did not generate a trip signal, and the system 100 maintained operations.

EXAMPLE 2

Figure 8A:
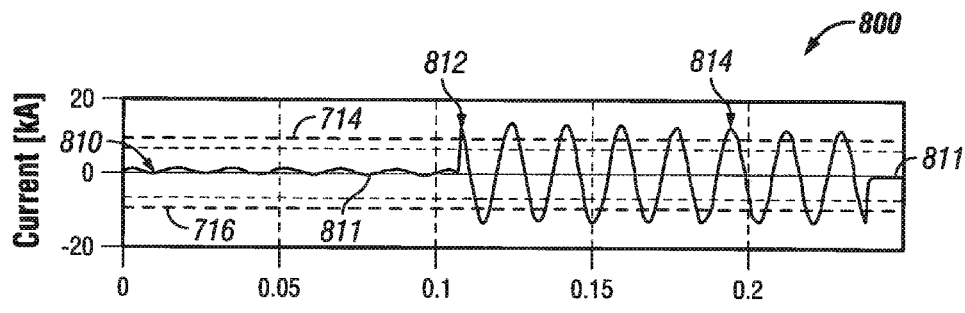
FIGS. 8A-F show various graphs of an example of an input signal that includes a fault experienced by an example protective device in accordance with certain example embodiments.

Consider another example, shown in FIGS. 8A through 8F, which describes that the example method for mitigating the effect of a power spike on a protective device in accordance with one or more example embodiments described above properly operates for a fault in the power system that does not generate a power spike. FIG. 8A shows a graph 800 of a raw (unfiltered) input signal 810 received by a protective device 150 from a sensing device 140. The raw input signal 810 is substantially constant at a normal operating current 811 (approximately 200 A) until a fault current 812 (of approximately 10 $kA_{RMS}$) that begins at approximately 0.11 seconds. The magnitude of the fault 812 exceeds the threshold 714 and the threshold 716.

Figure 8B:
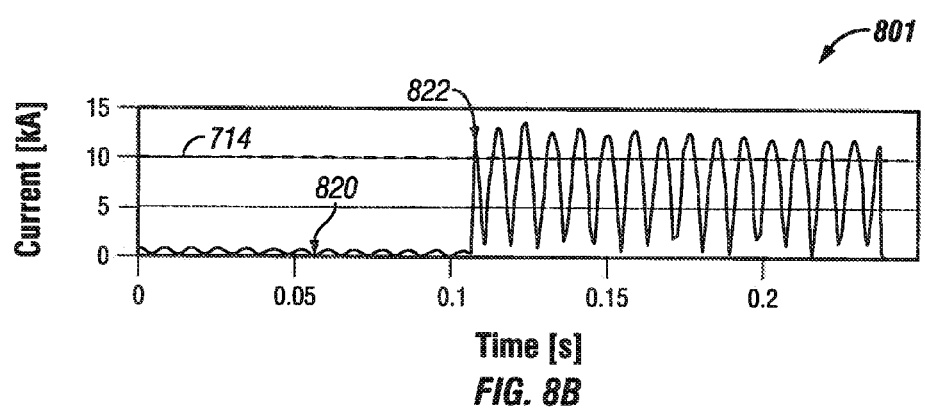

FIG. 8B shows a graph 801 of the absolute value of the raw signal 820 from FIG. 8A. Most of the absolute value of the raw signal 820 is a normal current level prior to 0.11 seconds in the graph 801. After approximately 0.11 seconds, the magnitude of the fault 822 exceeds the threshold 714.

Figure 8C:
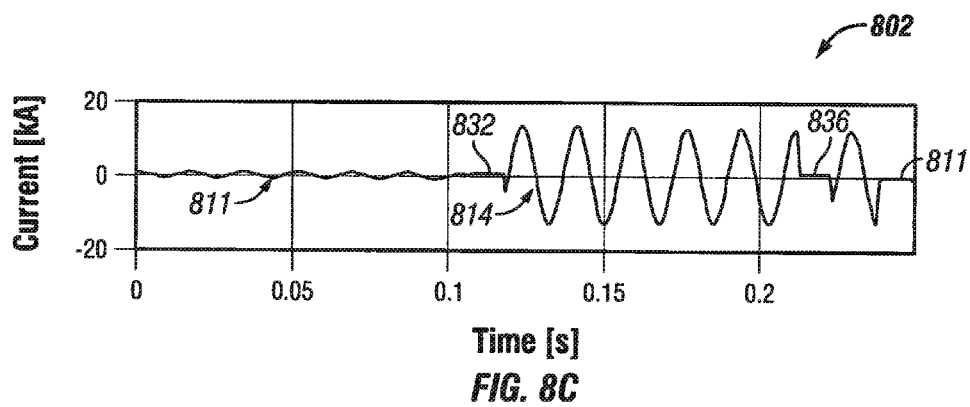

FIG. 8C shows a graph 802 of the input signal of FIG. 8A using example embodiments described herein. Prior to the fault 812 at approximately 0.11 seconds, the signal 810 is the input signal. The signal 810 represents normal operating conditions and does not exceed a threshold value 714, 716. At approximately 0.11 seconds, when the fault 812 begins, example embodiments temporarily mitigate the effect of the fault 812 on the protective device 150. Specifically, protection engine 206 determines that the input signal 812 has initially exceeded a threshold value 714. This event is initially noted as the exceeded threshold value 840 in the graph 803 shown in FIG. 8D.

Figure 8D:
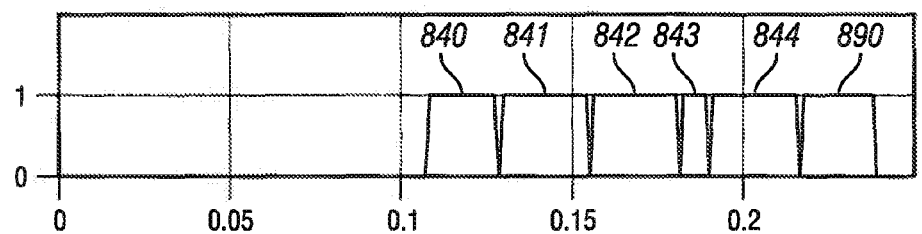
Figure 8E:
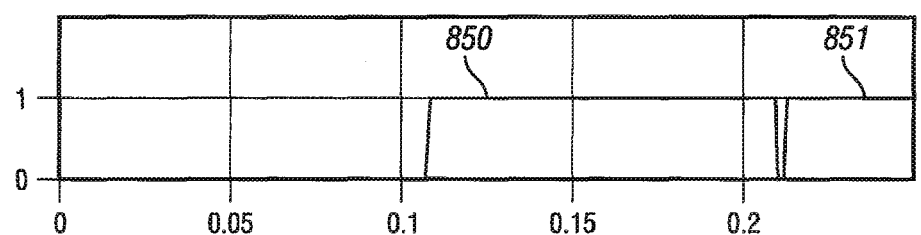
Figure 8F:
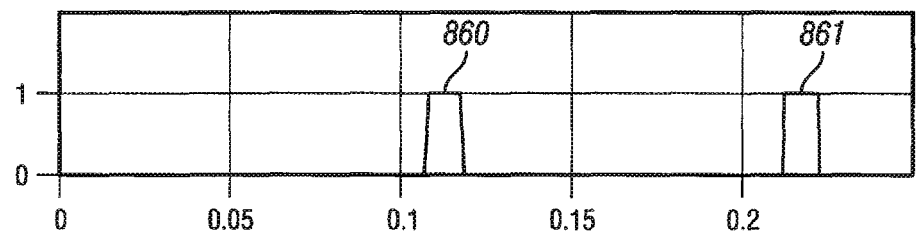

Once the protection engine 206 determines that the input signal 812 has exceeded a threshold value 714, at approximately 0.1 seconds on the timeline, the protection engine 206 sends a signal to the timer 212 to have the timer 212 start measuring a latch time period 850 (shown in the graph 804 of FIG. 8E and lasting approximately 0.06 seconds) and an initial time period 860 (shown in the graph 805 of FIG. 8F). During the initial time period 860, which lasts for approximately 0.008 seconds and covers approximately one half of one cycle of the input signal 810, the input signal 810 of FIG. 8C is replaced with a set value signal 832. The set value signal 832 is shown in the graph 802 of FIG. 8C as a constant value that is approximately equal to the average peak of the input signal 810 (or any other set of data) before the fault 812.

At the end of the initial time period 860, at approximately 0.12 seconds on the timeline, the protection engine 206 stops replacing the input signal 811 with the set value signal 832 and prevents the input signal 814 from further being replaced by the set value signal 832. As in FIGS. 7A-F, during the initial time period 860 and the remainder of the latch time period 850 (which lasts for approximately 0.06 seconds), the protection engine 206 sends the input signal 814 (which, during the initial time period 860 is the set value signal 832) to the digital filter 208 to generate a filtered signal.

If the protection engine 206 determines during the remainder of the latch time period 850 that a fault exists between the sensing devices 140 and 141, then the protection engine 206 instructs the trip mechanism 214 to generate a trip signal and send the trip signal to the breakers 120, 121 to trip (open) the breakers 120, 121.

In this case, because the input signal 814 is a fault, the trip signal would be generated after the end of the initial time period 860 when the protection engine 206 stops replacing the input signal 811 with the set value signal 832. This causes a delay in generating a trip signal by the trip mechanism 214. Thus, the delay in generating a trip signal for a legitimate fault 812, not preceded by a power spike, by a protective device 150 using example embodiments is approximately one half of one cycle compared to a protective device operating without example embodiments described herein.

The graphs in FIGS. 8D-E show the importance of the latch time period 850. In certain example embodiments, during the initial time period 860, the protective device 150 operates normally. However, because the set value signal 832 (which is not greater than a threshold value 714, 176) replaces the input signal 811 (which may or may not be an isolated power spike) during the initial time period 860, the trip mechanism 214 of the protective device 150, while enabled, is not instructed to generate a trip signal during the initial time period 860.

Once the initial time period 860 ends, for the duration of the latch time period 850, the protective device 150 receives the input signal 814 (which, in this example is a fault). In other words, after the initial time period 860 ends and for the duration of the latch time period 850, the input signal 814 is no longer replaced with the set value signal 832. Thus, the filtered signal, based on the input signal 814, is detected by the protection engine 206 as being a fault. Here, even though the threshold values 714, 716 are exceeded a number of times during the remainder of the latch time period 850, the input signal 814 is not replaced with the set value signal 832 after the initial time period 860 ends and for the remainder of the latch time period 850 using example embodiments.

In this example, after the initial time period 860 ends and during the duration of the latch time period 850, the threshold values 714, 716 are exceeded by the input signal 814 almost constantly, as shown in FIG. 8D by 840, 841, 842, 843, 844, and 890, with occasional intermittent breaks. Specifically, as shown in FIG. 8D, without the latch time period 850, the input signal 814 would be replaced constantly (6 times in this example) for as long as a fault lasts. In such a case, the protection engine 206 could not detect the actual fault, and the trip mechanism 214 could not generate a trip signal to isolate and/or clear the fault.

When the latch time period 850 ends, the fault signal 814 continues, and the exceeded reshold value 890 also continues. Because the latch time period 850 ends and because the input signal 814 exceeds the threshold values 714, 716, another initial time period 861 and another latch time period 851 is initialized at substantially the same time by the protection engine 206. During the initial time period 861, as shown in FIGS. 8B and 8C, the input signal 814 exceeds the threshold 714 (denoted in FIG. 8D by 890) and is replaced with a set value signal 836, which may be substantially the same as the set value signal 832.

When the initial time period 861 ends (starting the remainder of the latch time period 851), the process described above repeats itself. In other words, the protection engine 206 stops replacing the input signal 814 with the set value signal 836 and prevents the input signal 814 from further being replaced by the set value signal 836. Again, during the initial time period 861 and the remainder of the latch time period 851, the protection engine 206 sends the input signal 814 (which, during the initial time period 861 is the set value signal 836) to the digital filter 208 to generate a filtered signal.

The graphs shown in FIGS. 8D-F are merely intended to show how example embodiments work independent of a trip signal to open a breaker and isolate a fault. Normally, when the trip mechanism 214 generates and sends a trip signal to a breaker 120, 121, the fault is isolated, and the input signal 811 no longer exceeds a threshold value 714, 716. In such a case, example embodiments would not continue to receive an input signal that constantly exceeds a threshold value 714, 716.

Figure 9A:
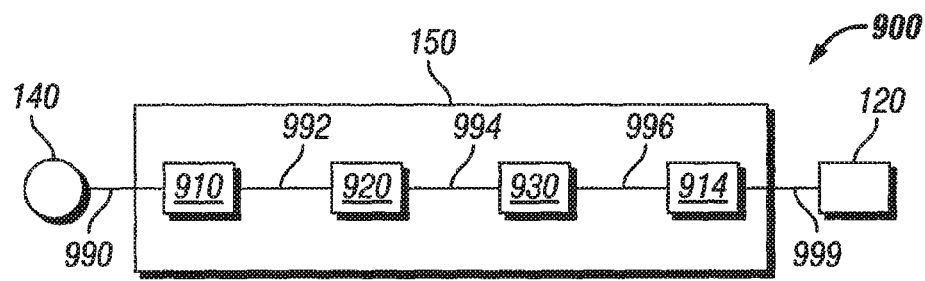
FIG. 9A shows a schematic flow diagram of an input signal through a protective device without the use of certain example embodiments.
Figure 9B:
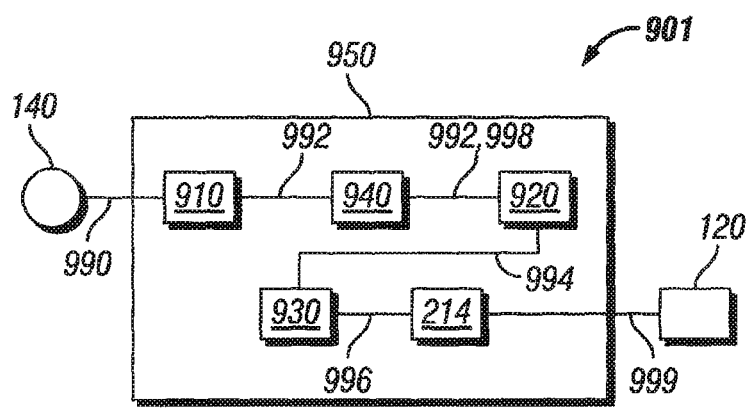
FIG. 9B shows a schematic flow diagram of an input signal through a protective device using certain example embodiments.

FIG. 9A shows an example schematic flow diagram 900 of an input signal through a protective device 150 without the use of certain example embodiments. FIG. 9B shows an example schematic flow diagram 901 of an input signal through a protective device 950 using certain example embodiments. Referring to FIGS. 1, 2, 9A, and 9B, without using certain example embodiments, a raw input signal 990 is produced by a sensing device 140 and sent to an analog filter 910 in a protective device 150. After being processed by the analog filter 910, the raw input signal 990 becomes an input signal 992, which proceeds to a digital filter 920 in the protective device 150. After being processed by the digital filter 920, the input signal 992 becomes a filtered signal 994 and is sent to a protection engine 930, which may be the same or different than the protection engine 206 of FIG. 2. The protection engine 930 then sends data 996 to the trip mechanism 214, which is always enabled and uses the data 996 to determine whether a trip signal 999 is generated and sent to a breaker 120.

In FIG. 9B, using example embodiments, an extra step is added to the sequence shown above in FIG. 9A. Specifically, the input signal 992 (or, in some cases, the raw input signal 990) is received by the protective device 950 and, using exemplary embodiments, such input signal 992 is received by an example embodiment 940 to determine if a threshold value is exceeded. If the input signal 992 exceeds a threshold value, then the input signal 992 is substituted with a fixed value 998 for an initial time period and sent to the digital filter 920. If the input signal 992 does not exceed a threshold value, then the input signal 992 is sent on by the example embodiment 940 to the digital filter 920. Once the digital filter 920 receives the input signal 992 or the raw input signal 990, the sequence proceeds as in FIG. 9A above.

Example embodiments provide for mitigating the effect of a power spike on a protective device. Specifically, example embodiments provide for mitigating the effects of a power spike for an initial period of time. Specifically, example embodiments, during an initial time period, substitute a power spike that exceeds a threshold value with a value that is less than the threshold value. Once the initial time period has expired, and for the duration of a latch time period, the value of the input signal cannot be substituted, even if the input signal exceeds the threshold value. Thus, example embodiments allow a protective device to determine whether the power spike in the input signal is truly a fault condition or is merely a power spike that should not generate a trip signal. Example embodiments allow such a determination without delaying so long as to jeopardize assets within a system when a legitimate fault condition exists.

Example embodiments allow for a reduction in down time by reducing the amount of trip signals that are generated in response to power spikes caused by normal operating conditions that are commonly (but incorrectly) interpreted by protective devices as requiring a trip signal. Thus, example embodiments save in lost opportunity costs, as well as unnecessary maintenance and operations costs.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A method for mitigating the effect of a power spike on a protective device, the method comprising:
  receiving an input signal;
  determining that the input signal exceeds a threshold value;
  upon determining that the input signal exceeds the threshold value:
    starting an initial time period; and
    starting a latch time period, wherein the latch time period is greater than the initial time period;
  replacing the input signal with a set value signal for the initial time period, wherein the set value signal has a value that is less than the threshold value; and
  preventing, when the initial time period ends and during a remainder of the latch time period, further replacement of the input signal with the set value signal.

2. The method of claim 1, further comprising:
  determining, at a subsequent time after the remainder of the latch time period ends, that the input signal exceeds the threshold value;
  upon determining that the input signal exceeds the threshold value at the subsequent time:
    starting a subsequent initial time period; and
    starting a subsequent latch time period;
  replacing the input signal with the set value signal for the subsequent initial time period; and
  preventing, when the subsequent initial time period ends and during a remainder of the subsequent latch time period, further replacement of the input signal with the set value signal.

3. The method of claim 1, further comprising:
  allowing, during the remainder of the latch time period, the input signal to pass unaltered to a digital filter.

4. The method of claim 1, wherein the initial time period is approximately several milliseconds.

5. The method of claim 1, wherein the latch time period is no more than 5 cycles.

6. The method of claim 1, wherein the set value signal is zero.

7. The method of claim 1, wherein the set value signal is an average of the input signal prior to the initial time period.

8. The method of claim 1, wherein the input signal is an unfiltered signal.

9. The method of claim 1, wherein receiving the input signal comprises:
receiving an unfiltered signal; and
filtering, using an analog filter, the unfiltered signal to generate the input signal.

10. The method of claim 1, wherein receiving the input signal comprises:
receiving a plurality of unfiltered signals.

11. The method of claim 1, wherein starting the latch time period is performed using a hardware processor.

12. The method of claim 1, wherein the threshold value is approximately at least two times an average of the input signal prior to the initial time period.

13. A protective device, comprising:
memory for storing a plurality of instructions;
a hardware processor communicably coupled to the memory, wherein the hardware processor executes the plurality of instructions stored in the memory;
a timer that measures a latch time period and an initial time period;
a protection engine communicably coupled to the timer, a first sensing device, and the hardware processor, wherein the protection engine:
receives an input signal derived from a first signal generated by the first sensing device;
determines whether the input signal exceeds a threshold value;
initiates, when the input signal exceeds the threshold value, the timer to measure the initial time period and the latch time period;
replaces the input signal with a set value signal during the initial time period; and
prevents, when the initial time period ends and during a remainder of the latch time period, further replacement of the input signal with the set value signal; and
a trip mechanism operatively coupled to the protection engine, wherein the trip mechanism generates and sends a trip signal when the input signal, during the remainder of the latch time period, exceeds the threshold value,
wherein the latch time period is greater than the initial time period.

14. The protective device of claim 13, wherein the first sensing device comprises a Rogowski coil.

15. The protective device of claim 13, further comprising:
an analog filter communicably coupled to the protection engine, wherein the analog filter:
receives the first signal generated by the first sensing device; and
filters the first signal to generate the input signal.

16. The protective device of claim 13, wherein the protection engine further:
determines, at a subsequent time after the remainder of the latch time period, whether the input signal exceeds the threshold value;
initiates, when the input signal exceeds the threshold value at the subsequent time, the timer to measure a subsequent initial time period and a subsequent latch time period;
replaces the input signal with the set value signal during the subsequent initial time period; and
prevents, when the subsequent initial time period ends and during a remainder of the subsequent latch time period, further replacement of the input signal with the set value signal.

17. The protective device of claim 16, wherein the protection engine ceases comparing the input signal and the threshold value during the subsequent initial time period.

18. A protective device system, comprising:
a first sensing device coupled to a first conductor, wherein the first sensing device generates a signal based on power flowing through the first conductor; and
a protective device communicably coupled to the first sensing device, wherein the protective device comprises:
memory for storing a plurality of instructions;
a hardware processor communicably coupled to the memory, wherein the hardware processor executes the plurality of instructions stored in the memory;
a timer that measures a latch time period and an initial time period;
a protection engine communicably coupled to the timer, the first sensing device, and the hardware processor, wherein the protection engine:
receives an input signal derived from the signal generated by the first sensing device;
determines whether the input signal exceeds a threshold value;
initiates, when the input signal exceeds the threshold value, the timer to measure the initial time period and the latch time period;
replaces the input signal with a set value signal during the initial time period; and
prevents, when the initial time period ends and during a remainder of the latch time period, further replacement of the input signal with the set value signal; and
a trip mechanism operatively coupled to the protection engine, wherein the trip mechanism generates a trip signal when the input signal, during the remainder of the latch time period, exceeds the threshold value.

19. The protective device system of claim 18, further comprising:
a circuit breaker electrically coupled to the protective device, wherein the circuit breaker opens when the circuit breaker receives the trip signal.

20. The protective device system of claim 18, further comprising an additional protective device communicably coupled to the protective device, the first sensing device, and a second sensing device, wherein the protective device and the additional protective device are communicably coupled using a fiber optic technology.

* * * * *